(12) United States Patent
Dziduch et al.

(10) Patent No.: US 11,595,241 B2
(45) Date of Patent: Feb. 28, 2023

(54) SYSTEMS AND METHODS FOR MANAGING A SECURITY SYSTEM

(71) Applicant: Johnson Controls Tyco IP Holdings LLP, Milwaukee, WI (US)

(72) Inventors: Marcin Dziduch, London (GB); Conor Joseph Donovan, Cork (IE); Abdul Razak, Cork (IE)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 0 days.

(21) Appl. No.: 16/157,009

(22) Filed: Oct. 10, 2018

(65) Prior Publication Data

US 2020/0119973 A1 Apr. 16, 2020

(51) Int. Cl.
*H04L 41/0604* (2022.01)
*H04L 43/10* (2022.01)
*H04L 12/423* (2006.01)
*G06F 9/54* (2006.01)
*H04L 43/16* (2022.01)
*G06F 16/2458* (2019.01)

(52) U.S. Cl.
CPC .......... *H04L 41/0622* (2013.01); *G06F 9/542* (2013.01); *G06F 16/2477* (2019.01); *H04L 12/423* (2013.01); *H04L 41/0618* (2013.01); *H04L 43/10* (2013.01); *H04L 43/16* (2013.01)

(58) Field of Classification Search
CPC ..... H04L 43/08; H04L 12/2818; H04L 43/16; H04L 43/00
USPC .......................................... 709/224
See application file for complete search history.

(56) References Cited

U.S. PATENT DOCUMENTS

| | | | | |
|---|---|---|---|---|
| 5,347,515 | A * | 9/1994 | Marino | H04L 12/403 370/452 |
| 5,471,194 | A * | 11/1995 | Guscott | G08B 29/24 340/511 |
| 6,570,610 | B1 * | 5/2003 | Kipust | G06F 21/35 348/156 |
| 6,721,283 | B1 * | 4/2004 | Marino | H04L 12/42 370/252 |
| 8,630,741 | B1 * | 1/2014 | Matsuoka | F24F 11/88 700/12 |
| 2004/0057181 | A1 * | 3/2004 | Marino | G08B 29/06 361/100 |
| 2004/0070401 | A1 * | 4/2004 | Marino | H02H 3/08 324/500 |

(Continued)

*Primary Examiner* — Mahran Yabu Roumi
(74) *Attorney, Agent, or Firm* — Foley & Lardner LLP (57) ABSTRACT

A computing device for managing a security system is disclosed. The computing device includes one or more processors. In some embodiments, the one or more processors can receive a number of events occurring in one or more of a number of polling loop networks. The events are monitored by a control device. The one or more processors can determine whether an occurrence frequency of the events exceeds a first threshold, where the occurrence frequency is defined as a number of the events divided by a period of time during which the events occurred. The one or more processors can in response to determining that the occurrence frequency exceeds the first threshold, automatically notify a user of the security system via a web application.

17 Claims, 4 Drawing Sheets

(56) References Cited

U.S. PATENT DOCUMENTS

| | | | |
|---|---|---|---|
| 2005/0183130 A1* | 8/2005 | Sadja | H04N 21/6543 348/192 |
| 2007/0085676 A1* | 4/2007 | Lee | G08B 25/14 340/539.18 |
| 2011/0150188 A1* | 6/2011 | Buss | G08B 29/123 379/27.01 |
| 2012/0222084 A1* | 8/2012 | Beaty | G06F 11/3409 726/1 |
| 2015/0091733 A1* | 4/2015 | Bullmore | G08B 29/22 340/653 |
| 2015/0254971 A1* | 9/2015 | Okeefe | G08B 29/126 340/511 |
| 2017/0033834 A1* | 2/2017 | Gross | H04B 3/52 |
| 2017/0110003 A1* | 4/2017 | Barson | G08B 25/04 |
| 2017/0124191 A1* | 5/2017 | Sareen | G06F 9/541 |
| 2017/0236405 A1* | 8/2017 | Khazanov | G08B 13/04 340/601 |
| 2017/0244740 A1* | 8/2017 | Mahabir | H04L 63/0428 |
| 2017/0279822 A1* | 9/2017 | Lord | H04L 63/1408 |
| 2018/0191730 A1* | 7/2018 | Deters | G06F 16/285 |
| 2018/0330597 A1* | 11/2018 | Burke | G08B 25/008 |
| 2019/0041822 A1* | 2/2019 | Burke | G05B 15/02 |
| 2019/0066042 A1* | 2/2019 | Conlon | H04W 4/029 |
| 2019/0147363 A1* | 5/2019 | Maheshwari | G06N 20/00 709/224 |
| 2019/0182627 A1* | 6/2019 | Thoresen | H04L 63/045 |
| 2020/0100076 A1* | 3/2020 | Skaaksrud | A62C 3/10 |

* cited by examiner

SYSTEMS AND METHODS FOR MANAGING A SECURITY SYSTEM

TECHNICAL FIELD

The present disclosure relates generally to a security system. The present disclosure relates more particularly to systems and methods for managing a security system that connects a number of security devices via one or more polling loops.

BACKGROUND

A security system, including a number of security devices, can interconnect the security devices by one or more communications techniques, e.g., a polling loop. In such a system that uses polling loops to communicate, a control panel generally polls or queries each of the security device on some periodic basis in order to ensure that the security devices are up and running. To assure the control panel can properly communicate with the security devices, irregular events occurring on the polling loop are desired to be monitored.

SUMMARY

According to some aspects, embodiments relate to systems and methods for managing a security system. In one aspect, the method can include receiving, from a control device, a number of events occurring in one or more of a number of polling loop networks. The control device can monitor the plurality of events. The method can include determining whether an occurrence frequency of the events exceeds a first threshold. The occurrence frequency is defined as a number of the events divided by a period of time during which the events occurred. The method can include in response to determining that the occurrence frequency exceeds the first threshold, automatically notifying a user of the security system.

In another aspect, a computing device for managing a security system is disclosed. The computing device includes one or more processors. In some embodiments, the one or more processors can receive a number of events occurring in one or more of a number of polling loop networks. The events are monitored by a control device. The one or more processors can determine whether an occurrence frequency of the events exceeds a first threshold, where the occurrence frequency is defined as a number of the events divided by a period of time during which the events occurred. The one or more processors can in response to determining that the occurrence frequency exceeds the first threshold, automatically notify a user of the security system via a web application.

In yet another aspect, a security system is disclosed. The security system can include a number of polling loop networks, each of which includes a number of security devices respectively coupled to one another on a 2-wire polling loop. The security system can include a control device coupled to the polling loop networks. The control device can receive a number of polling loop short events occurring in one or more of the polling loop networks. The security system can include a computing device coupled to the control device via a network. The computing device can determine whether an occurrence frequency of the polling short events exceeds a threshold. In response to determining that the occurrence frequency exceeds the threshold, the computing device can automatically notify a user of the security system via a web application. In some embodiments, the occurrence frequency is defined as the number of the polling short events divided by a period of time during which the polling loop events occurred.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

In general, a security system can connect a number of security devices through one or more polling loops. For example, the security system can include at least one control device or panel to manage plural sets of security devices through respective polling loops. Each set of the security devices may be deployed in a space (e.g., a business building), and each security device can monitor a respective area of the space (sometimes referred to as a zone). If there is a change in monitored status, each security device can report to the control device through a remote point module or controller, which can be communicatively (e.g., electrically) coupled between the security device and the control device on a polling loop. The control device can periodically poll, query, or otherwise communicate with one or more of such remote control modules to assure safety of the monitored space.

In some cases, a physical short circuit, an open circuit, an overly drawn current, and/or a low voltage can occur on the polling loop, which are collectively referred to as a "polling loop short event" herein. Such a polling loop short event may occur due to various issues such as, for example, the low power (battery) level of a connected security device, one or more radio frequency interferences, one or more faulty or damaged wiring issues, etc. When a polling loop short event occurs, the remote point module may fail in communicating with the control device (e.g., responding to the polling from the control device). Accordingly, risks or critical events, even detected by security devices, may remain undetected to the control device, which may adversely affect the safety of the monitored space.

The present disclosure provides various embodiments of systems and methods for managing a security system connecting a number of security devices through one or more polling loops. In some embodiments, the disclosed security system include a monitoring computing device that can communicate with a central control device monitoring one or more sets of security devices connected on respective polling loops. The monitoring computing device can receive, from the central control device, a number of polling loop short events that occurred over a past period of time. In some embodiments, the monitoring computing device can analyze the occurred polling loop short events to infer, deduce, or determine one or more patterns characterizing the polling loop short events in terms of occurrence locations, occurrence time, and/or occurrence numbers. Based on the patterns, the monitoring computing device can notify an administrator of a monitored space.

Figure 1:
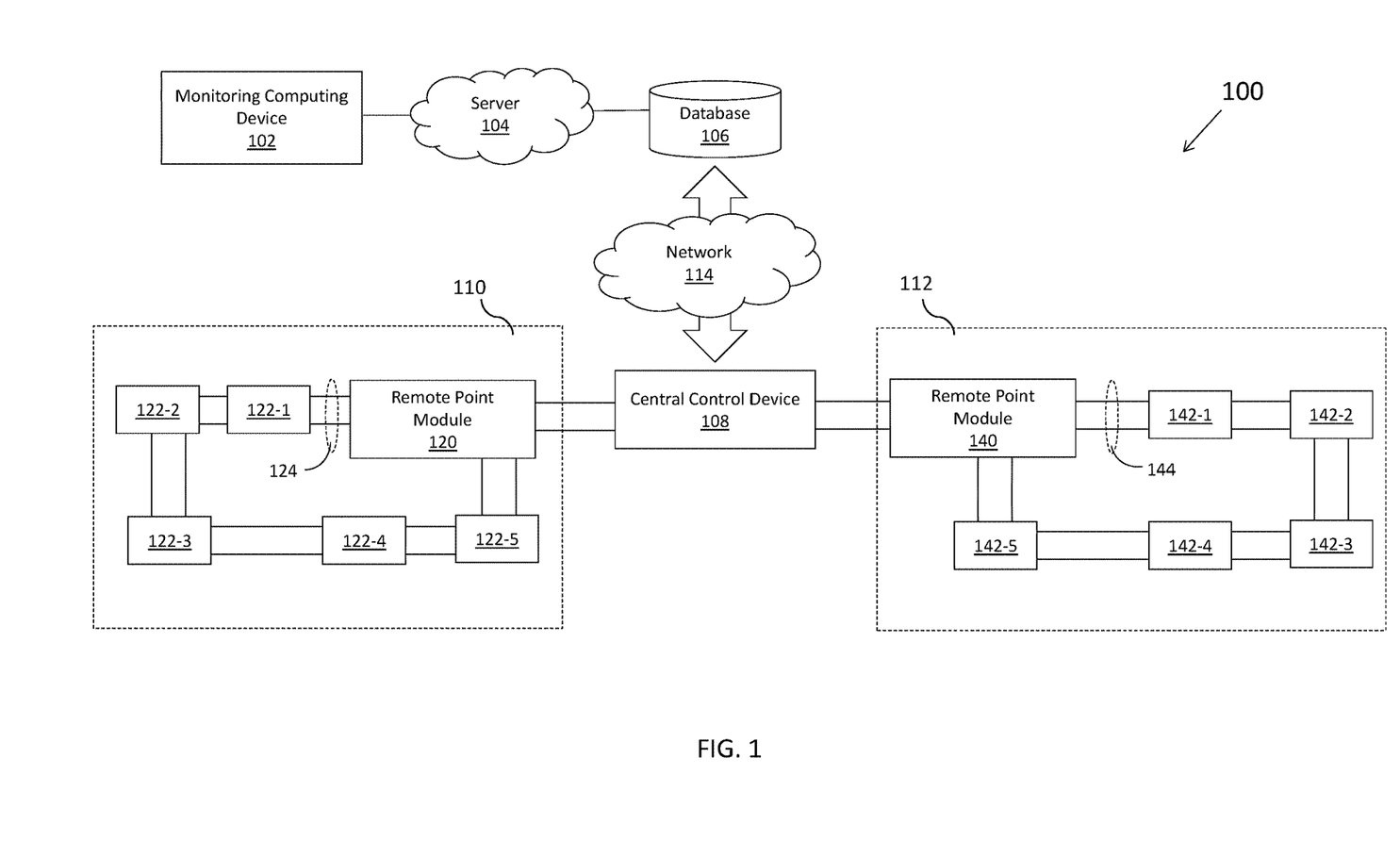
FIG. 1 a schematic diagram of a security system connecting a number of security devices via one or more polling loops, according to some embodiments.

Referring to FIG. 1, a security system 100 is shown, in accordance with some embodiments. The security system 100 can include a monitoring computing device 102, one or more servers 104, database 106, a central control device 108, and one or more polling loop networks 110 and 112. The monitoring computing device 102 can communicate, interface with, or otherwise interact with the central control device 108 by accessing the database 106 via the one or more servers 104, or directly via the network 114. Each of the polling loop networks 110 and 112 can include one or more security devices communicatively coupled to the central control device 108 through a polling loop, which shall be discussed in further detail below.

Each of the above-mentioned elements or entities is implemented in hardware, or a combination of hardware and software, in one or more embodiments. Each component of the security system 100 can be implemented using hardware or a combination of hardware or software detailed above in connection with FIG. 4. For instance, each of these elements or entities can include any application, program, library, script, task, service, process or any type and form of executable instructions executing on hardware of a client device (e.g., the monitoring computing device 102). The hardware includes circuitry such as one or more processors in one or more embodiments.

In some embodiments, the monitoring computing device 102 can be served from/or hosted on the one or more servers 104. The monitoring computing device 102 can communicate, interface with, or otherwise interact with the database 106 via the one or more servers 104. The database 106 can be managed or maintained by the server 104. The database 106 can be maintained or managed by the same server that provides the functionality of the monitoring computing device 102. In some cases, the database 106 can be maintained or managed by a server that is different from the server that provides the functionality of the monitoring computing device 102.

The network 114 can include one or more component or functionality of a transport network, or some other network or Internet communication channel. For example, the transport network can use one or more transport protocols and can be a wired network, wireless network, cloud network, local area network, metropolitan area network, wide area network, public network, private network, and the like.

Still referring to the illustrated embodiment of FIG. 1, and in further detail, the security system 100 can include one or more polling loop networks, e.g., 110 and 112. Each of the polling loop networks may be deployed in respective different zones of a same space (e.g., a building), or in respective different spaces (e.g., different buildings). As shown, the polling loop network 110 includes a remote point module 120, and a number of security devices 122-1, 122-2, 122-3, 122-4, and 122-5, that are communicatively coupled to one another via a polling loop 124; and the polling loop network 112 includes a remote point module 140, and a number of security devices 142-1, 142-2, 142-3, 142-4, and 142-5, that are communicatively coupled to one another via a polling loop 144. According to some embodiments, each of the polling loop networks of the security system 100 may be substantially similar to each other, and thus the following discussions shall be focused on one of the polling loop networks, e.g., the polling loop network 110.

Referring to the polling loop network 110, the remote point module 120 may be communicatively coupled between the security devices 122-1-5 and the central control device 108 via the polling loop 124, in accordance with some embodiments. The polling loop 124 can include a 2-wire polling loop. For example, the polling loop 124 includes 2 wire cables that connect the security devices 122-1-5 to the central control device 108 through the remote point module 120. The polling loop can be used to transmit data and power. Each of the security devices 122-1-5 can monitor a specific access point or a sub-zone, and report to the remote point module 120, through the polling loop 124, if there is a change in status. In other words, each of the remote point modules of the system 100 can monitor or supervise various status of a zone using a number of security devices deployed in respective different sub-zones of the zone.

The security devices 122-1-5 can include initiating devices and notification devices. Examples of the initiating device can include a motion sensor, a vibration sensor, a glass break sensor, a door or window contact, a security camera, a smoke or fire detector, and the like. Examples of the notification device can include a pulsing incandescent light, a strobe light, an electromechanical horn, an electronic horn, a chime, a bell, a speaker, and the like. Accordingly, a door or window contact can be used to monitor opening of doors or windows, a security camera can be used to determine if an intruder has entered the premises such as by passive infrared surveillance techniques, a smoke or fire detector can be used to determine if a fire has started, etc.

The central control device 108 can periodically query or poll the number of remote point modules (e.g., 120, 140, etc.) to check the status via respective polling loops. For example, the central control device 108 may periodically send a heartbeat signal to the remote point modules, wait for a period of time to receive respective responses from the remote point modules, and determine whether the remote point modules are functioning based on whether the responses are received within the period of time. As such, the central control device 108 can assure the zones, each of which is monitored by at least one respective remote point module, is being monitored and safe.

In some cases, one or more polling loop short events, as discussed above, can occur on a polling loop, which can cause a central control device to lose communication with one or more remote point modules and corresponding security devices coupled to the respective remote point modules. When such a polling loop short event occurs, one or more events that have been detected by a security device (e.g., a fire) may be overlooked, which can negatively affect the intended function of a security system. In contrast, the disclosed security system 100 can use the monitoring computing device 102 to communicate with the central control device 108 to automatically analyze data collected by the central control device 108 (e.g., information as to one or more occurred polling loop short events). By automatically analyzing the data, the monitoring computing device 102 can provide one or more suggestions to a user of the security system 100 (e.g., an administrator of a building monitored by the system 100) to take actions accordingly. The monitoring computing device 102 will be discussed in further detail as follows.

Figure 2:
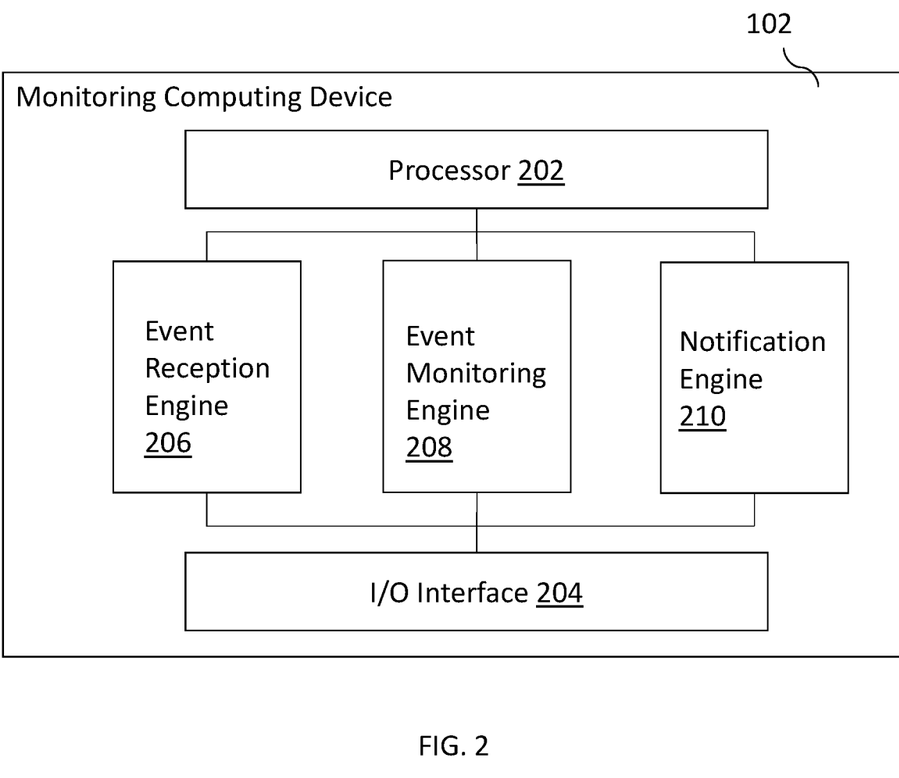
FIG. 2 is an exemplary block diagram of a monitoring computing device of the security system of FIG. 1, according to some embodiments.

Referring to FIG. 2, depicted is a block diagram of one embodiment of the monitoring computing device 102. The monitoring computing device 102 can include one or more processors 202, an input/output (I/O) interface device 204, an event reception engine 206, an event monitoring engine 208, and a notification engine 210. The components or engines of the monitoring computing device 102 can be communicatively coupled to one another via a data bus, or the like. The monitoring computing device 102 can use the I/O interface device 204 to communicate with other devices such as, for example, database 106, central control device 108, etc.

Each of the above-mentioned elements or entities is implemented in hardware, or a combination of hardware and software, in one or more embodiments. Each component of the monitoring computing device 102 can be implemented using hardware or a combination of hardware or software detailed above in connection with FIG. 4. For instance, each of these elements or entities can include any application, program, library, script, task, service, process or any type and form of executable instructions executing on hardware of a client device. The hardware includes circuitry such as one or more processors in one or more embodiments.

In some embodiments, the one or more processors 202 may execute the event reception engine 206 to receive a number of events occurring in one or more of a number of polling loop networks. The one or more processors 202 may execute the event monitoring engine 208 to determine whether an occurrence frequency of the number events exceeds a threshold. The one or more processors 202 may execute the notification engine 210 to automatically notify a user of a security system, responsive to determining that the occurrence frequency exceeds the threshold. The event reception engine 206, event monitoring engine 208, and notification engine 210 shall be respectively discussed in further detail below.

The event reception engine 206 can receive, accept, or collect a number of events occurring in one or more of the polling loop networks (e.g., 110, 112, etc.) from the central control device 108 via the network 114, or access the database 106 via the server 104 to retrieve the number of events. In the embodiments of receiving the events from the central control device 108, the event reception engine 206 may store the events in the database 106, simultaneously with or subsequently to the reception of the events; and in the embodiments of retrieving the events from the database 106, the event reception engine 206 may periodically access the database to acquire the events.

The event may include a polling loop short event that occurred in one of the polling loop networks of the security system 100. In some embodiments, the received or retrieved event can include various information regarding the event such as, for example, the time when the polling loop short event occurred, the location where the polling loop short event occurred, etc. Referring again to FIG. 1, the location of the polling loop short event may be identified by an identification of a remote point module, according to some embodiments. In response to receiving no response from a certain remote point module during the periodic polling process, the central control device 108 can identify the location of the remote point module using the identification of the remote point module based on a pre-calibrated table or list. The table or list can map each of the remote point modules (and the respective identification) of the system 100 to a respective location (e.g., a zone of a building).

The event monitoring engine 208 can communicate with the event reception engine 206 to process, inspect, or otherwise analyze the retrieved or received events to cause the notification engine 210 to take further actions. For example, the event monitoring engine 208 can determine whether an occurrence frequency of the events exceeds a predefined threshold. The occurrence frequency may be defined as a number of the events divided by a period of time during which the events occurred. The event monitoring engine 208 may identify or form one or more patterns that can characterize the events in terms of an occurrence location to determine the occurrence frequency. In some embodiments, the event monitoring engine 208 may identify or form at least one pattern characterizing the events in a structured query language (SQL) form. If the event monitoring engine 208 determines that the occurrence frequency has exceeded the threshold (e.g., 5 polling loop short events per day), the event monitoring engine 208 may communicate with the notification engine 210 to take further actions. On the other hand, if the event monitoring engine 208 determines that the occurrence frequency has not exceeded the threshold, the event monitoring engine 208 may remain analyzing the events.

In another example, the event monitoring engine 208 can determine whether an occurrence frequency of a subset of events exceeds a respective predefined threshold. The event monitoring engine 208 can group the retrieved or received events into a number of subsets of events in accordance with the respective occurrence locations. For instance, a first subset of events, associated with a remote point module (e.g., 120), may occur in a first location where a first polling loop network (e.g., 110) is deployed; and a second, different subset of events, associated with another remote point module (e.g., 140), may occur in a second, different location where a second polling loop network (e.g., 112) is deployed. In response to grouping the event into respective subsets, the event monitoring engine 208 can identify or form one or more patterns that can characterize each of the subset of events. The event monitoring engine 208 may form the one or more patterns characterizing each subset of events may be in a structured query language (SQL) form to isolate other subsets of events in the database. In response to identifying one or more patterns for each of the subset of events, the event monitoring engine 208 can determine respective occurrence frequencies of the subsets. In some embodiments, the event monitoring engine 208 can compare the occurrence frequencies with respective thresholds to determine whether to communicate with the notification engine 210. Continuing with the above instance, the event monitoring engine 208 may compare the occurrence frequency of the first subset of events occurring in the polling loop network 110 with a first threshold and the occurrence frequency of the second subset of events occurring in the polling loop network 112 with a second threshold, where the first and second thresholds can be similar to or different from each other. The event monitoring engine 208 may estimate the first occurrence frequency of the first subset of events according to a first pattern to update the first threshold.

The notification engine 210 can automatically notify a user of a security system, responsive to determining that an occurrence frequency exceeds a threshold. In response to the event monitoring engine 208 determining an occurrence frequency of all the events or a subset of events exceeds a respective threshold and interacting with the notification engine 210, the notification engine 210 can automatically notify the user of the security system 100 to take actions. In some embodiments, the notification engine 210 may use the I/O interface device 204 to notify the user. For example, the notification engine 210 can use the I/O interface device 204 to display a message, "Event Threshold Reached," to the user. In another example, the notification engine 210 can use the I/O interface device 204 to alarm the user by a chime, a video, or any of various form that can draw the user's attention. In some embodiments, the notification engine 210 can include other information in the notification to the user. For example, the notification engine 210 can include when and/or where the events or subset of events occurred. As such, once the user receives the notification, the user can take actions to address the events more quickly and efficiently.

Figure 3:
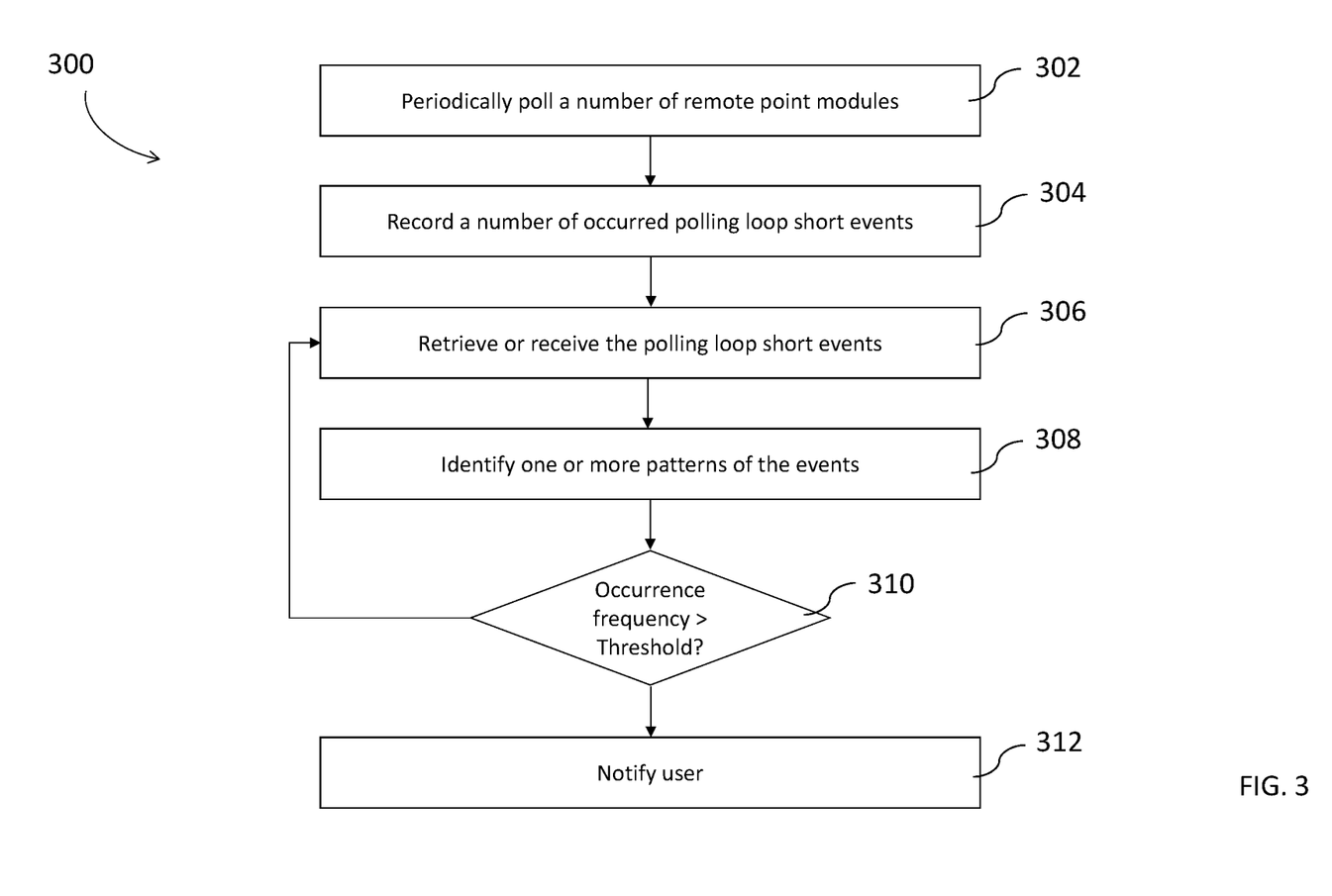
FIG. 3 is a flow chart of an exemplary method for managing the security system of FIG. 1, according to some embodiments.

Referring to FIG. 3, depicted is a flow diagram of one embodiment of a method for managing a security system connecting a number of security devices via one or more polling loops. The functionalities of the method 300 can be implemented using, or performed by, the components detailed herein in connection with FIGS. 1-2. In brief overview, a central control device can periodically poll a number of remote point modules at 302. At 304, the central control device can record a number of occurred polling loop short events. At 306, a monitoring computing device can retrieve or receive the polling loop short events. At 308, monitoring computing device can identify one or more patterns of at least some of the events. At 310, the monitoring computing device can determine whether an occurrence frequency of the events exceeds a predefined threshold. If so, the monitoring computing device can notify a user of the security system. On the other hand, if not, the method 300 may proceed back to 306 in which the monitoring computing device may retrieve or receive additional polling loop short events.

Still referring to FIG. 3, and in further detail, a central control device (e.g., 108) can periodically poll a number of remote point modules (e.g., 120, 140, etc.) at 302. In some embodiments, the central control device can periodically send one or more heartbeat signals to the connected remote point modules, each of which can monitor a respective number of security devices through a polling loop. If the central control device does not receive a response to the sent heartbeat signal from a remote point module within a predetermined period of time, the central control device may determine that a polling loop short event occurred on the polling loop (network) where the remote point module is deployed.

Next, at 304, the central control device can record, collect, or otherwise log such occurred polling loop short events. In some embodiments, while recording the polling loop short events, the central control device can record various information regarding to each of the polling loop short events. For example, the central control device can record the location where each of the polling loop short events occurred by identifying the respective remote point module(s), the time when each of the polling loop short events occurred, etc.

At 306, an event reception engine (e.g., 206) of a monitoring computing device (e.g., 102) can receive or retrieve the polling loop short events from the central control device or a database (e.g., 106). In some embodiments, simultaneously with or subsequently to the central control device recording the occurred polling loop short event, the central control device can store the event (and corresponding information) to the database, or communicate with the event reception engine. In the example of storing the event to the database, the event reception engine can retrieve the event from the database. In the example of communicating with the event reception engine, the event reception engine may directly receive the event from the central control device through a network.

At 308, an event monitoring engine (e.g., 208) of the monitoring computing device can identify one or more patterns of the received or retrieved events. In some embodiments, the event monitoring engine may start to identify a pattern of the retrieved or received events in response to the retrieved or received events reaching a certain number (e.g., when a number of the retrieved or received events reaches 5), or periodically identify a pattern of the retrieved or received events (e.g., every day, every week, etc.). The event monitoring engine can identify a pattern for a subset of the events or all of the events based on the respective occurrence locations and/or occurrence times. Accordingly, the event monitoring engine can use the identified pattern to determine an occurrence frequency of the subset or all of the events.

At 310, the event monitoring engine can determine whether the occurrence frequency of the subset or all of the events exceeds a predefined threshold. If the event monitoring engine has determined that the occurrence frequency exceeds the threshold, the event monitoring engine can communicate with a notification engine (e.g., 210) of the monitoring computing device to (312) to cause the notification engine to notify a user of the security system. In some embodiments, the notification engine can notify the user via a web application (e.g., a Software-as-a-Service (SaaS) application). On the other hand, if the event monitoring engine has determined that the occurrence frequency does not exceed the threshold, the event monitoring engine can communicate with the event reception engine to cause the event reception engine to retrieve or receive other events for analysis (306).

Figure 4:
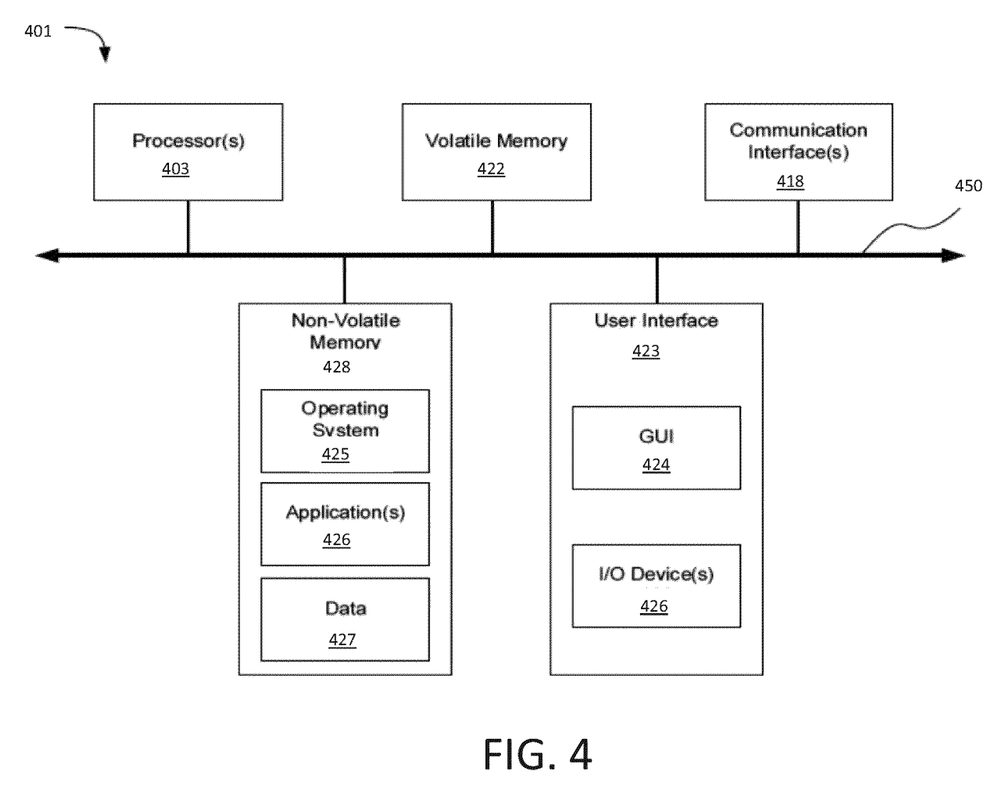
FIG. 4 is a block diagram of a computing device, according to some embodiments.

Referring to FIG. 4, a block diagram of computer 401 is depicted. Computer 401 can include one or more processors 403, volatile memory 422 (e.g., random access memory (RAM)), non-volatile memory 428 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 423, one or more communications interfaces 418, and communication bus 450. User interface 423 can include graphical user interface (GUI) 424 (e.g., a touchscreen, a display, etc.) and one or more input/output (I/O) devices 426 (e.g., a mouse, a keyboard, a microphone, one or more speakers, one or more cameras, one or more biometric scanners, one or more environmental sensors, one or more accelerometers, etc.). Non-volatile memory 428 stores operating system 415, one or more applications 416, and data 417 such that, for example, computer instructions of operating system 415 and/or applications 416 are executed by processor(s) 403 out of volatile memory 422. In some embodiments, volatile memory 422 can include one or more types of RAM and/or a cache memory that can offer a faster response time than a main memory. Data can be entered using an input device of GUI 424 or received from I/O device(s) 426. Various elements of computer 401 can communicate via one or more communication buses, shown as communication bus 450.

Computer 401 as shown in FIG. 4 is shown merely as an example, as controller, clients, servers, intermediary and other networking devices and can be implemented by any computing or processing environment and with any type of machine or set of machines that can have suitable hardware and/or software capable of operating as described herein. Processor(s) 403 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A "processor" can perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" can be analog, digital or mixed-signal. In some embodiments, the "processor" can be one or more physical processors or one or more "virtual" (e.g., remotely located or "cloud") processors. A processor including multiple processor cores and/or multiple processors can provide functionality for parallel, simultaneous execution of instructions or for parallel, simultaneous execution of one instruction on more than one piece of data.

Communications interfaces 418 can include one or more interfaces to enable computer 401 to access a computer network such as a Local Area Network (LAN), a Wide Area Network (WAN), a Personal Area Network (PAN), or the Internet through a variety of wired and/or wireless or cellular connections.

In some embodiments, each of the above-mentioned engines, elements or entities is implemented in hardware, or a combination of hardware and software, in one or more embodiments. Each component of the monitoring computing device 102 can be implemented using hardware or a combination of hardware or software detailed above in connection with FIG. 4. For instance, each of these engines, elements or entities can include any application, program, library, script, task, service, process or any type and form of executable instructions executing on hardware of a device (e.g., the monitoring computing device 102). The hardware includes circuitry such as one or more processors in one or more embodiments.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A method for managing a security system, the method comprising:
   receiving, from a control device comprising one or more processors, a plurality of events occurring in one or more of a plurality of polling loop networks and simultaneously storing, by a computing device coupled to the control device via a network, the plurality of events in a database, the control device configured to monitor the plurality of events, wherein each of the plurality of polling loop networks includes a plurality of security devices respectively coupled to the control device via a remote point module on a 2-wire polling loop;
   determining, by the computing device, whether an occurrence frequency of the plurality of events exceeds a first threshold, the occurrence frequency defined as a number of the plurality of events divided by a period of time during which the plurality of events occurred;
   grouping, by the computing device, the plurality of events into a first subset of the plurality of events associated with a first remote point module and a second subset of the plurality of events associated with a second remote point module;
   subsequently identifying, by the computing device, one or more patterns characterizing the plurality of events, wherein a first pattern of the one or more patterns includes a number of the first subset of the plurality of events and a first location where the first subset of the plurality of events occurred, wherein a second pattern of the one or more patterns includes a number of the second subset of the plurality of events and a second location where the second subset of the plurality of events occurred, and wherein the first location includes a location of the first remote point module identified based on a pre-calibrated table of the remote point modules;
   estimating, by the computing device, a first occurrence frequency of the first subset of the plurality of events in the first location based on the first pattern to update the first threshold for the first location;
   estimating, by the computing device, a second occurrence frequency of the second subset of the plurality of events in the second location according to the second pattern to update the first threshold for the second location, wherein the second occurrence frequency differs from the first occurrence frequency; and
   in response to determining that the occurrence frequency exceeds the first threshold, notifying a user of the security system and providing the user with the first location of the first subset of the plurality of events and suggestions to take action via a web application having an input/output (I/O) interface of the computing device.

2. The method of claim 1, wherein each of the plurality of events indicates a polling loop short that occurred in one of the plurality of polling loop networks.

3. The method of claim 1, wherein the plurality of security devices respectively coupled to the control device includes at least one of a motion sensor, a vibration sensor, a glass break sensor, a door or window contact, a security camera, or a fire detector.

4. The method of claim 1, wherein each of the one or more patterns is in a structured query language (SQL) form that isolates respective events from other events in the database.

5. The method of claim 1, wherein the first pattern of the one or more patterns includes a time period during which the first subset of the plurality of events occurred.

6. The method of claim 5, comprising:
   providing the user with the time period during which the first subset of the plurality of events occurred.

7. The method of claim 1, wherein the second pattern of the one or more patterns includes a time period during which the second subset of the plurality of events occurred.

8. The method of claim 1, wherein the first and second locations are physically separated from each other with respective different ones of the plurality of polling loop networks deployed therein.

9. A computing device for managing a security system, comprising one or more processors, the one or more processors configured to:
   receive a plurality of events occurring in one or more of a plurality of polling loop networks, the plurality of events monitored by a control device, wherein each of the plurality of polling loop networks includes a plurality of security devices respectively coupled to the control device via a remote point module on a 2-wire polling loop;

simultaneously store the plurality of events in a database;

determine whether an occurrence frequency of the plurality of events exceeds a first threshold, the occurrence frequency defined as a number of the plurality of events divided by a period of time during which the plurality of events occurred;

group the plurality of events into a first subset of the plurality of events associated with a first remote point module and a second subset of the plurality of events associated with a second remote point module;

subsequently identify one or more patterns characterizing the plurality of events, wherein a first pattern of the one or more patterns includes a number of the first subset of the plurality of events and a first location where the first subset of the plurality of events occurred, wherein a second pattern of the one or more patterns includes a number of the second subset of the plurality of events and a second location where the second subset of the plurality of events occurred, and wherein the first location includes a location of the first remote point module identified based on a pre-calibrated table of the remote point modules;

estimate a first occurrence frequency of the first subset of the plurality of events in the first location according to the first pattern to update the first threshold for the first location;

estimate a second occurrence frequency of the second subset of the plurality of events in the second location according to the second pattern to update the first threshold for the second location, wherein the second occurrence frequency differs from the first occurrence frequency; and in response to determining that the occurrence frequency exceeds the first threshold, notify a user of the security system and provide the user with the first location of the first subset of the plurality of events and suggestions to take action via a web application.

10. The computing device of claim 9, wherein each of the plurality of events indicates a polling loop short that occurred in one of the plurality of polling loop networks.

11. The computing device of claim 9, wherein the plurality of security devices respectively coupled to the control device includes at least one of a motion sensor, a vibration sensor, a glass break sensor, a door or window contact, a security camera, or a fire detector.

12. The computing device of claim 9, wherein each of the one or more patterns is in a structured query language (SQL) form that isolates respective events from other events in the database.

13. The computing device of claim 9, wherein the first pattern of the one or more patterns includes a time period during which the first subset of the plurality of events occurred.

14. The computing device of claim 9, wherein the second pattern of the one or more patterns includes a time period during which the second subset of the plurality of events occurred.

15. The computing device of claim 9, wherein the first and second locations are physically separated from each other with respective different ones of the plurality of polling loop networks deployed therein.

16. A security system, comprising:
a plurality of polling loop networks, each of which includes a plurality of security devices respectively coupled to a respective remote point module on a 2-wire polling loop;
a control device comprising one or more first processors, coupled to the plurality of polling loop networks, and configured to detect a plurality of polling loop short events occurring in one or more of the plurality of polling loop networks based on a loss of communication between the control device and the remote point modules of the one of the plurality of polling loop networks; and
a computing device comprising one or more second processors, coupled to the control device via a network, and configured to determine whether an occurrence frequency of the plurality of polling short events exceeds a threshold and in response to determining that the occurrence frequency exceeds the threshold, group the plurality of events into a first subset of the plurality of events associated with a first remote point module and a second subset of the plurality of events associated with a second remote point module, subsequently identify one or more patterns characterizing the plurality of events, wherein a first pattern of the one or more patterns includes a number of the first subset of the plurality of events and a first location where the first subset of the plurality of events occurred, wherein a second pattern of the one or more patterns includes a number of the second subset of the plurality of events and a second location where the second subset of the plurality of events occurred, and wherein the first location includes a location of the first remote point module identified based on a pre-calibrated table of the remote point modules, estimate a first occurrence frequency of the first subset of the plurality of events in the first location according to the first pattern to update a first threshold for the first location, estimate a second occurrence frequency of the second subset of the plurality of events in the second location according to the second pattern to update the first threshold for the second location, wherein the second occurrence frequency differs from the first occurrence frequency, and notify a user of the security system and provide the user with the first location of the first subset of the plurality of events and suggestions to take action via a web application wherein the occurrence frequency is defined as a number of the plurality of polling short events divided by a period of time during which the plurality of polling loop events occurred.

17. The computing device of claim 13, wherein the one or more processors are configured to provide the user with the time period during which the first subset of the plurality of events occurred.

* * * * *